Feb. 21, 1933. H. P. MOSS 1,898,640
FOOT REST
Filed May 17, 1930
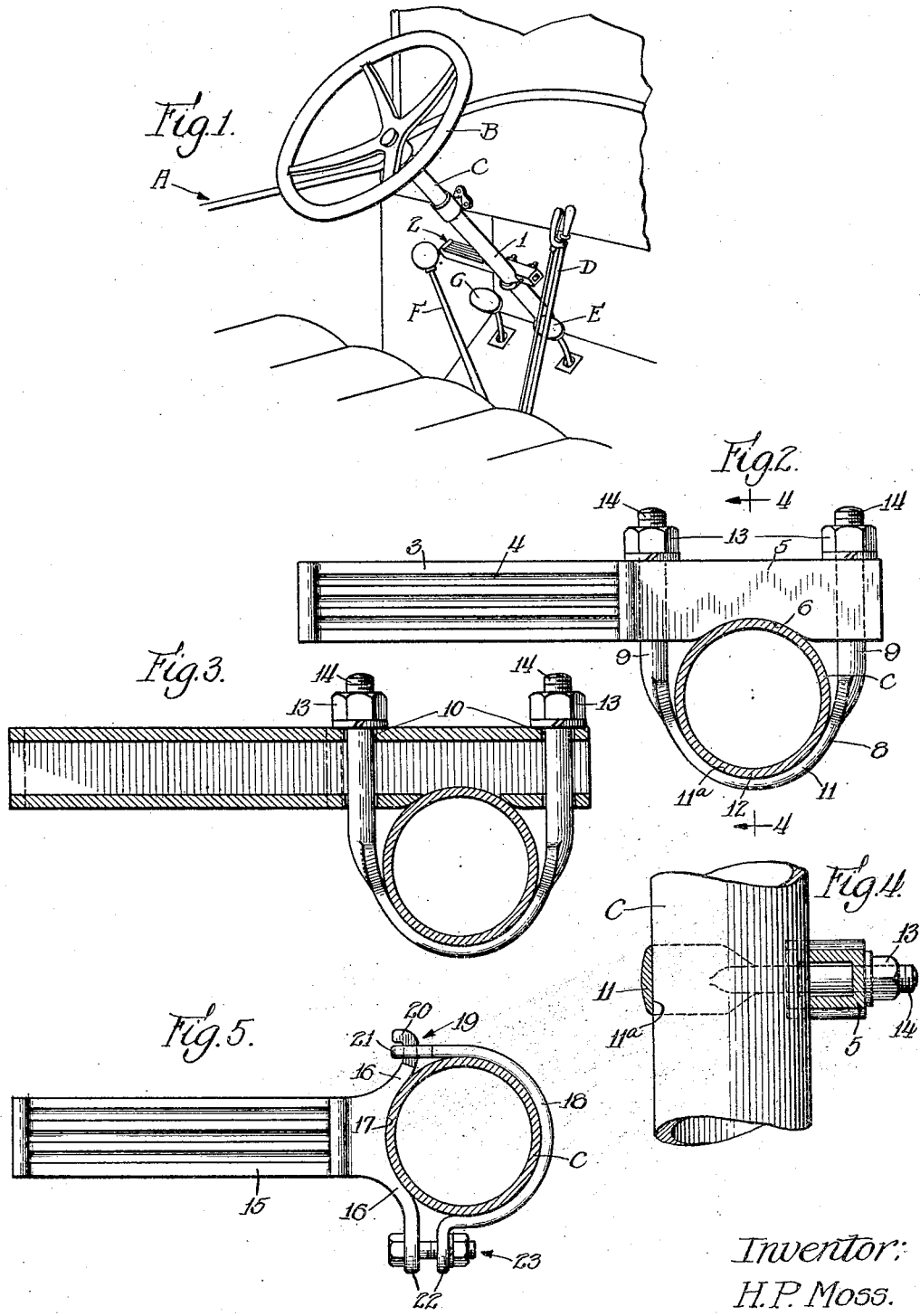
Inventor:
H. P. Moss.
By Louis Sheldon Atty.

Patented Feb. 21, 1933

1,898,640

UNITED STATES PATENT OFFICE

H. P. MOSS, OF DETROIT, MICHIGAN, ASSIGNOR TO GENERAL SPRING BUMPER CORPORATION, OF DETROIT, MICHIGAN, A CORPORATION OF MICHIGAN

FOOT REST

Application filed May 17, 1930. Serial No. 453,366.

This invention has to do with foot rests.

It is well known that the space providing a rest for the feet in conjunction with a chair or the like, while convenient for some people, is inconvenient for others by reason of the fact that the support for the feet is not located in a position where the feet tend normally to repose. This inconvenience is especially acute in the case of persons who are required to occupy the same seat for a substantial length of time, as in the case of those riding in conveyances. In the category just mentioned, those occupied with the driving or piloting of the vehicle are especially subject to inconvenience from the source set forth.

A large number of people, in driving a motor vehicle, habitually rest the feet on the clutch and brake pedals while these are not being used. This is particularly true of clutch pedals, since these are located adjacent one side of the vehicle, where a relatively small space for the movement of the foot is provided, when compared to the space adjacent the brake pedal. The pressure of the foot when thus resting on the pedal is quite substantial and results in a slight movement of the clutch parts, causing undue wear thereof and thereby greatly abridging the life of the clutch. This, notwithstanding the usual instructions in connection with automobile driving to avoid "riding" the clutch. It is, accordingly, the principal object of my invention to provide a foot support or rest which may be located in any position to suit the convenience of the individual, which is simple and inexpensive, which may be applied and removed with facility and dispatch, and which will overcome the disadvantages mentioned.

To the above and other ends, my invention contemplates the provision of an adjustable foot rest provided with means for firmly clamping the same to a stationary part of the conveyance or the like, such as the steering column. The foot rest or support may be positioned in proximity to the pedal, if so desired, in such a manner as not to interfere with the proper operation of the pedal, yet providing a convenient support for the foot of the driver when the pedal is in inactive position.

In the accompanying drawing which illustrates my present invention and forms a part of this specification:

Fig. 1 is a fragmentary perspective view illustrating the practical application of my invention;

Fig. 2 is an elevational view taken in approximately a horizontal plane, showing my invention applied to the steering column, the latter being shown in section;

Fig. 3 is a view similar to Fig. 2 but shows the foot rest in section;

Fig. 4 is a fragmentary sectional view taken approximately in the plane indicated by the line 4—4 of Fig. 2, certain parts being shown in elevation; and Fig. 5 shows another modification of my invention.

While my invention is capable of various applications, I have illustrated and described the same by way of example with reference to the clutch pedal of a motor vehicle. Referring to the drawing, the reference character A indicates generally an automobile including, among other things, the usual steering wheel B, steering column C, emergency brake lever D, foot brake pedal E, gear shift lever F, and clutch pedal G. In a large number of vehicles, a portion of the steering column is positioned near the clutch pedal as well as the brake pedal and, in accordance with my invention, said portion, which in the drawing is indicated by the reference numeral 1, has attached thereto a foot rest indicated generally at 2. The foot rest or support may in one form embody a bar 3, which may be solid or hollow, as herein illustrated. The bar 3 comprises a foot supporting portion 4 which may be fluted as shown or may be otherwise roughened to provide against slippage of the shoe thereon, or, if desired, may be left smooth. The portion 5 of the bar 3 is, in one form, provided with a recess 6, preferably shallow or otherwise formed in order that the wall of the recess shall be capable of engaging columns of various shapes and sizes, without marring the columns.

When applied in operative position, the foot rest is positioned as shown in the various figures with the wall of the recess 6 in engagement with the outer surface of the column or other standard C. For firmly maintaining the bar 3 in position with respect to the column C, I provide a U-bolt 8, the arms 9 of which pass through openings 10 in the portion 5 of the bar 3. The bight 11 of the U-bolt engages the portion 12 of the column C opposite that portion fitting into the recess 6. When it is desired to attach the bar 3 firmly in place, the arms 9 are inserted through the openings 10 and nuts 13 are applied on the threaded ends 14 of the arms 9 and tightened up to cause the wall of the recess 6 to firmly grasp the outer surface of the column C. The bight 11 is flexible and may be resilient and is in the form of a flat strap having a gripping portion 11ª of substantial area. This portion is engageable with the outer surface of the column, regardless of the shape or size of the latter, and will serve, when the nuts 13 are properly tightened, to hold the bar in position without marring the surface of the column. The nut and lock washer means employed for fastening the foot rest in position is merely exemplary, since any other suitable device may be employed for this purpose.

In the form of my invention illustrated in Fig. 5, the foot rest bar 15 is substantially symmetrical and is forked to provide a pair of arms 16 and a shallow recess 17, whose wall is engageable, as in the case of the recess 6, with the steering column C. The companion clamp member 18 is in the form of a flexible or resilient strap detachably hinged, by reason of the hook connection indicated generally at 19, with one of the arms 16 and is adapted for gripping engagement with the column C in much the same manner that the gripping portion 11ª engages the portion 12 of the column C in the modification above described. The hook connection 19 includes the reduced hook portion 20 of the bar 17 and the longitudinally apertured end portion 21 of the clamp member 18. The opposite arm 16 and the corresponding portion of the member 18 are provided with mating flanges 22 which are somewhat spaced to provide for proper tightening of the foot rest parts of the column C. Suitable adjusting and securing means 23 serve to hold the foot rest in place on the column.

The bar recesses 6 and 19 are preferably though not necessarily arcuate, the angle subtended thereby being preferably a small part of 360 degrees, in order that the extremities of the recess wall may not project laterally beyond the column to an excessive degree.

It will be evident from the foregoing that the attaching means described permit of locating the foot rest in any position lengthwise and circumferentially of the column. In the event, moreover, that the foot rest 2 as indicated in Fig. 1 fail to accommodate the foot conveniently, said foot rest may be rotated about its longitudinal axis 180 degrees and attached to the column in such a manner that the bight of the U-bolt is directed forwardly of the car instead of rearwardly as now shown.

My invention is capable of use not only in passenger cars, but also in trucks, busses, airplanes, motor boats and the like.

The attaching portions are so dimensioned as to permit a given foot rest to be securely fastened to various shapes and sizes of the steering column. The attaching bolts and nuts or the like may be at all times positioned for easy accessibility and the operation of attaching and removing the foot rest is greatly simplified by my invention so that it may be performed in a few moments. The foot rest or support may be made of any metal or other material and is not only extremely simple in its manufacture, but the cost of making is extremely low.

Should it appear in any case that the steering column is not appropriately positioned for the attachment of the foot rest in accordance with my invention, some other stationary part of the vehicle may be employed for this purpose, such as, for example, the wall adjacent the pedal. To be sure, in such instance, the attaching means would be appropriately modified.

It is obvious from Fig. 1 that the foot of the driver, when the clutch pedal is inactive, may comfortably rest upon the foot support 2. In view of the qualities above set forth in relation to my device, it is obvious that the same is capable of ready installation with automobiles already in use as well as those to be manufactured.

While I have illustrated and described certain embodiments of my invention, many modifications may be made without departing from the spirit of the invention. I accordingly do not wish to be limited to the precise details of construction set forth, but desire to avail myself of all changes within the scope of the appended claims.

Having thus described my invention, what I claim as new and desire to secure by Letters Patent of the United States is:

A foot rest comprising a substantially symmetrical T-shaped member including a stem and a head, said stem having a rough upper surface, said head including laterally and oppositely extending arms, and having an arcuate recess between the arms for engagement with a supporting column, a complementary resilient strap including an end portion having interlocking cooperation with one of said arms and an intermediate portion arcuately formed for clamping engagement with the supporting column, and means adjustably anchoring the other end of said strap to the other said arm for adjustably mounting the foot rest on the supporting column.

In witness whereof, I have hereunto subscribed my name.

H. P. MOSS.